United States Patent [19]

Bishop et al.

[11] Patent Number: 5,607,989
[45] Date of Patent: Mar. 4, 1997

[54] PIPERIDINYL PHOSPHITE COMPOSITIONS AND POLYOLEFIN COMPOSITIONS CONTAINING THEM

[75] Inventors: Clyde E. Bishop, Hockessin; Vu A. Dang, Bear; Joseph Metrick, Wilmington, all of Del.

[73] Assignee: Montell North America Inc., Wilmington, Del.

[21] Appl. No.: 374,394

[22] Filed: Jan. 17, 1995

Related U.S. Application Data

[63] Continuation of Ser. No. 145,288, Oct. 29, 1993, abandoned.

[51] Int. Cl.$^6$ .................................................. C08K 5/524
[52] U.S. Cl. .......................................... 524/102; 524/108
[58] Field of Search .................................. 524/108, 102

[56] References Cited

U.S. PATENT DOCUMENTS

| | | | |
|---|---|---|---|
| 3,640,928 | 2/1972 | Murayama et al. | 260/23 |
| 3,840,494 | 10/1974 | Murayama et al. | 260/45.8 |
| 4,016,118 | 4/1977 | Hamada et al. | 260/17.4 |
| 4,233,208 | 11/1980 | Spivack | 524/149 |
| 4,388,119 | 6/1983 | Uchiyama | 106/316 |
| 4,483,952 | 11/1984 | Uchiyama | 524/108 |
| 4,507,415 | 3/1985 | Kasai et al. | 524/108 |
| 4,867,907 | 9/1989 | Burton et al. | 524/149 |
| 4,912,155 | 3/1990 | Burton | 524/149 |
| 4,957,956 | 9/1990 | Neri et al. | 524/120 |
| 4,959,402 | 9/1990 | Williams et al. | 524/108 |
| 5,001,179 | 3/1991 | Kauffman et al. | 524/275 |
| 5,021,481 | 6/1991 | Galbo et al. | 546/25 |
| 5,153,249 | 10/1992 | Yokote et al. | 524/108 |

FOREIGN PATENT DOCUMENTS

| | | |
|---|---|---|
| 997353 | 9/1976 | Canada. |
| 54-103461 | 8/1979 | Japan. |
| 01311065 | 12/1989 | Japan. |
| 2265377 | 9/1993 | United Kingdom. |

*Primary Examiner*—Veronica P. Hoke

[57] ABSTRACT

Disclosed is a piperidinyl phosphite composition consisting of a piperidinyl phosphite compound and an additive having a melting point of greater than 155° C. selected from the group consisting of (i) sorbitol compounds, (ii) phosphite compounds and (iii) sterically hindered phenolic compounds, and polyolefin compositions containing them.

5 Claims, No Drawings

PIPERIDINYL PHOSPHITE COMPOSITIONS AND POLYOLEFIN COMPOSITIONS CONTAINING THEM

This application is a continuation of application Ser. No. 08/145,288, filed Oct. 29, 1993 now abandoned.

FIELD OF THE INVENTION

The present invention relates to a piperidinyl phosphite composition, and more specifically, to a piperidinyl phosphite composition which is useful as an additive for improving the stabilization and transparency of crystalline propylene polymer materials at lower processing temperatures.

BACKGROUND OF THE INVENTION

Typically, crystalline propylene polymer materials, such as polypropylene and propylene polymer based copolymers have found extensive use in various formed articles, such as injection-molded articles, blow-molded articles, films, sheets and fibers, because of their excellent mechanical properties. However, due to their nature, crystalline propylene polymer materials are to varying degrees unstable in regards, for example, to oxidation and to ultraviolet radiation. In addition to the above disadvantages, they are also poor in transparency. To improve the transparency of polyolefins, nucleating or clarifying agents are generally incorporated therein as described in U.S. Pat. No. 4,388,119 which discloses a composition consisting essentially of a solid powdery dibenzylidene sorbitol coated with a higher fatty acid.

U.S. Pat. Nos. 3,640,928 and 3,840,494 and Canadian patent 997,353 disclose synthetic polymer compositions stabilized against photo- and thermo-deterioration by adding a sufficient amount of a piperidine derivative.

Lower processing temperatures are preferred in the industry to prevent the degradation or decomposition of the propylene polymer material. However, at lower processing temperatures white specks of unmelted and poorly dispersed stabilizers and/or nucleators are found in the molded articles because the processing temperatures are lower than the melting points of the particular stabilizer and/or nucleator being used. Thus, there is a desire to find a way to use certain stabilizers and nucleators at lower processing temperatures, without obtaining white specks in the final product.

SUMMARY OF THE INVENTION

It has been found in accordance with the present invention that by forming an intimate mixture of a piperidinyl phosphite compound with certain conventional additives, i.e. certain nucleators and primary stabilizers, the melting point of said additives is depressed or lowered. This enables the additives to be processed at a lower temperature when incorporated in polyolefins and provides products without the white specking due to unmelted or poorly dispersed additives.

According to one embodiment of the present invention there is provided a phosphite composition consisting essentially of (a) a piperidinyl phosphite compound of the formula:

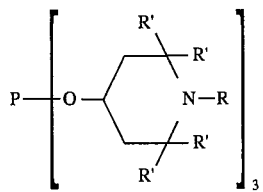

wherein R is a $C_{1-4}$alkyl, a $C_{1-4}$alkoxy or a $C_{1-8}$alkanoyl and R' is a $C_{1-4}$alkyl; and (b) an additive having a melting point greater than 155° C. selected from the group consisting essentially of (i) sorbitol compounds, (ii) phosphite compounds and (iii) sterically hindered phenolic compounds, wherein the ratio of a:b is from 1:1 to 1:10 or 2:1.

In another embodiment of the present invention there is provided a polyolefin composition comprising (A) 100 parts of a propylene polymer material and (B) from 0.02 to 0.6 parts of (1) a phosphite composition consisting essentially of (a) a piperidinyl phosphite of the formula:

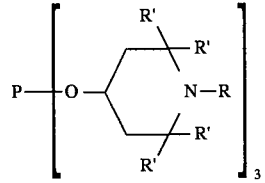

wherein R is a $C_{1-4}$alkyl, a $C_{1-4}$alkoxy or a $C_{1-8}$alkanoyl, and R' is a $C_{1-4}$alkyl; and (b) an additive having a melting point greater than 155° C. selected from the group consisting essentially of (i) sorbitol compounds, (ii) phosphite compounds and (iii) sterically hindered phenolic compounds, wherein the ratio of a:b is from 1:1 to 1:10 or 2:1.

DETAIL DESCRIPTION OF THE INVENTION

All parts and percentages used in this application are by weight unless otherwise specified. Ambient or room temperature is approximately 25° C.

The phosphite compound of component (a) used in this invention is preferably a tris(1,2,2,6,6-pentamethylpiperidinyl) phosphite.

The sorbitol type nucleator compounds used in the present invention include dibenzylidene sorbitol, Millad 3940 bis(p-methylbenzylidene) sorbitol, bis(3,5-dimethylbenzylidene)sorbitol and bis(p-ethyl-benzylidene)sorbitol. Preferred are dibenzylidene sorbitol, bis(3,5-dimethylbenzylidene)sorbitol and bis(p-methyl-benzylidene)sorbitol.

Suitable examples of the sterically hindered phenolic compounds that can be used in the present invention are 1,3,5-trimethyl-2,4,6-tris(3,5-di-t-butyl-4-hydroxybenzyl-)benzene stabilizer; 1,3,5-tris(4-t-butyl-3-hydroxy-2,6-dimethylbenzyl)-1,3,5-triazine-2,4,6-(1H,3H,5H)-trione stabilizer; 1,3,5-tris(3,5-di-tert-butyl-4-hydroxybenzyl)isocyanurate stabilizer; N',N'-bis[3-(3',5'-di-t-butyl-4-hydroxyphenyl)propanyl] hydrazine stabilizer.

Examples of the phosphite or phosphonite type compounds which can be used in the present invention are tris(2,4-di-t-butylphenyl)phosphite stabilizer; 2,2'-ethylidene bis(4,6-di-t-butylphenyl)fluorophosphonite stabilizer and bis(2,4-di-t-butylphenyl)-pentaerythrityl diphosphite stabilizer.

All of the stabilizing and nucleating additives useful in the present invention are commercially available.

The propylene polymer material is selected from the group consisting of (i) a crystalline homopolymer of propylene; (ii) a random copolymer of propylene and an olefin selected from the group consisting of ethylene and $C_4$-$C_{10}$ alpha-olefins, provided that, when the olefin is ethylene, the maximum polymerized ethylene content is about 10%, preferably about 4%, and when the olefin is a $C_4$-$C_{10}$ alpha-olefin, the maximum polymerized content thereof is about 20%, preferably about 16%; or (iii) a random terpolymer of propylene and an olefin selected from the group consisting of ethylene and $C_4$-$C_8$ alpha-olefins, provided that the maximum polymerized $C_4$-$C_8$ alpha-olefin content is about 20%, preferably about 16%, and, when ethylene is one of the olefins, the maximum polymerized ethylene content is about 5%, preferably about 4%, with a maximum comonomer content of 25%.

Suitable alpha-olefins of the formula $CH_2$=CHR include butene-1, pentene-1, 4-methylpentene-1, hexene-1, and octene-1.

The piperidinyl phosphite composition of the present invention is prepared by adding a pre-formed solution of a piperidinyl phosphite compound described above, to a solution of an additive described above, which also has been dissolved in solvent, and mixed for approximately 1 to 2 hours. The solvent is evaporated, the resultant alloy product is dried and pulverized to a fine powder.

The solvent used in the process of this invention can be any polar solvent which is a low boiling solvent and which does not react with the piperdinyl phosphite compound or the additive of the present invention.

Preferred solvents are acetone, methylene chloride, dichloroethane, tetrahydrofuron (THF), and ethers. Most preferred is acetone.

When the piperidinyl phosphite composition of the present invention is incorporated into to a propylene polymer material at lower processing temperatures, the transparency of the resin is improved, with little or no evidence of white specks from unmelted and poorly dispersed additives.

The piperidinyl phosphite composition of this invention can be incorporated into a propylene polymer material by conventional mixing procedures.

A propylene polymer material containing the piperidinyl phosphite composition of this invention can be used in preparing films, sheets, fibers and molded articles.

The present invention will be illustrated in greater detail with reference to the examples of the invention set forth below.

EXAMPLE 1

A piperidinyl phosphite composition of tris(1,2,2,6,6-pentamethylpiperidinyl)phosphite and Ethanox 330 1,3,5-trimethyl-2,4,6-tris(3,5-di-t-butyl-4-hydroxybenzyl)benzene stabilizer, in a 1:1 ratio, was prepared by mixing, for approximately 2 hours, a pre-formed solution of 5 grams of the piperidinyl phosphite compound dissolved in a solution comprising 5 grams of the Ethyl AO-330 stabilizer dissolved in 20 ml of acetone. The solvent is evaporated, the resultant piperidine phosphite composition product is dried and pulverized to a fine powder.

The data showing the decrease in the melting point in the phenolic additive is set forth below in Table 1.

EXAMPLES 2–8

A piperidinyl phosphite composition was prepared according to the method described in Examples using the same ingredients, except varying the ratio of the piperidinyl phosphite compound and the phenolic additive as set forth below in Table 1.

The data showing the decrease in the melting point in the phenolic additive is set forth below in Table 1.

EXAMPLE 9

A piperidinyl phosphite composition was prepared according to Example 1, except that Millad 3940 bis(p-methylbenzylidene)sorbitol was used instead of Ethanox 330 stabilizer.

The data showing the decrease in the melting point in the sorbitol additive is set forth below in Table 1.

EXAMPLES 10–13

A piperidinyl phosphite composition was prepared according to the method described in Example 9 using the same ingredients, except varying the ratio of the piperidinyl phosphite compound and the sorbitol additive as set forth below in Table 1.

The data showing the decrease in the melting point in the sorbitol additive is set forth below in Table 1.

EXAMPLE 14

A piperidinyl phosphite composition was prepared according to Example 1, except that Irgafos 168 tris(2,4-di-t-butylphenyl)phosphite was used instead of Ethanox 330 stabilizer.

The data showing the decrease in the melting point in the phosphite additive is set forth below in Table 1.

EXAMPLES 15–17

A piperidinyl phosphite composition was prepared according to the method described in Example 14 using the same ingredients, except varying the ratio of the piperidinyl phosphite compound and the phosphite additive as set forth below in Table 1.

The data showing the decrease in the melting point in the phosphite additive is set forth below in Table 1.

EXAMPLE 18

A piperidinyl phosphite composition was prepared according to Example 1, except that Millad 3905 di-benzylidene sorbitol was used instead of Ethanox 330 stabilizer.

The data showing the decrease in the melting point in the sorbitol additive is set forth below in Table 1.

EXAMPLES 19–21

A piperidinyl phosphite composition was prepared according to the method described in Example 18 using the same ingredients, except varying the ratio of the piperidinyl phosphite compound and the sorbitol additive as set forth below in Table 1.

The data showing the decrease in the melting point in the sorbitol additive is set forth below in Table 1.

The melting points reported below in Table 1 were obtained using a capillary type apparatus which allows the temperature to be raised incrementally by degree.

TABLE 1

| Example | Ratio of phosphite compound:additive | M. Pt, C |
|---|---|---|
| Ethanox-330 | — | 245 |
| 1 | 1:1 | 150 |
| 2 | 1:2 | 155 |
| 3 | 1:3 | 190 |
| 4 | 1:4 | 195 |
| 5 | 1:5 | 200 |
| 6 | 1:7.5 | 220 |
| 7 | 1:10 | 230 |
| 8 | 2:1 | 115 |
| Millad 3940 | — | 245 |
| 9 | 1:1 | 185 |
| 10 | 1:2 | 190 |
| 11 | 1:3 | 200 |
| 12 | 1:4 | 235 |
| 13 | 2:1 | 180 |
| Irgafos 168 | — | 185 |
| 14 | 1:1 | 115 |
| 15 | 1:2 | 125 |
| 16 | 1:3 | 155 |
| 17 | 2:1 | 110 |
| Millad 3905 | — | 225 |
| 18 | 1:1 | 185 |
| 19 | 1:2 | 185 |
| 20 | 1:4 | 188 |
| 21 | 1:5 | 195 |

It can be seen from the data in Table 1 that the melting points of the piperidinyl phosphite compositions of the present invention containing the particular additive are significantly lower then the melting points of the additive alone.

EXAMPLES 21 AND 22

Described below is the use of a piperidinyl phosphite composition of the present invention consisting of a tris(1,2,2,6,6-pentamethylpiperidinyl)phosphite and Millad 3905 di-benzylidene sorbitol nucleator (1:2 ratio) in a propylene polymer material composition set forth below in Table 2. The ingredients of composition were mixed in a Henchell mill for approximately 5 min., at ambient temperature.

Then 3"×3" plaques of 40 mil thickness were injection molded from the mixture. The plaques were molded at 380° F. and 400° F.

TABLE 2

| | Examples | | Comparative Exmples | | |
|---|---|---|---|---|---|
| Ingredients | 21 | 22 | 1 | 2 | 3 |
| Polymer A[(1)] | 100 | 100 | 100 | 100 | 100 |
| CaSt[(2)] | 0.1 | 0.1 | 0.1 | 0.1 | 0.1 |
| NaSt[(3)] | — | — | — | — | 0.4 |
| GMS[(4)] | 0.15 | 0.15 | 0.15 | 0.15 | 0.14 |
| Example 18 Comp. | 0.33 | 0.33 | — | — | — |
| Nucleator 1[(5)] | — | — | 0.22 | 0.22 | 0.22 |
| Comp. 1[(6)] | — | — | 0.11 | — | — |
| B-215[(7)] | — | 0.15 | — | 0.15 | — |
| B-225[(8)] | — | — | — | — | 0.1 |
| Properties | | | | | |
| Molded @ 380° F. # of specks | 1 | 2 | >100 | 40 | 34 |
| Molded @ 400° F. # of specks | 1 | 2 | >100 | 27 | 24 |
| % Haze | — | 25 | 19 | 25 | 20 |

[(1)]Polymer A = an ethylene-propylene random copolymer having a melt flow rate of 12, and an ethylene content of 3.1%.
[(2)]CaSt = calcium stearate.
[(3)]NaSt = sodium stearate.
[(4)]GMS = glycerol monostearate.
[(5)]Nucleator 1 = Millad 3905 di (benzylidene) sorbitol nucleator.
[(6)]Comp. 1 = tris(1,2,2,6,6-pentamethylpiperidinyl) phosphite compound.
[(7)]B215 = 2:1 blend of Irgafos 168 tris(2,4-di-t-butylphenyl) phosphite stabilizer and Irganox 1010 tetrakis [methylene(3,5-di-t-butyl-4-hydroxyhydrocinnamate) methane].
[(8)]B225 = 1:1 blend of Irgafos 168 tris(2,4-di-t-butylphenyl) phosphite stabilizer and Irganox 1010 tetrakis [methylene(3,5-di-t-butyl-4-hydroxyhydrocinnamate) methane].

It can be seen from the data in Table 2 that the piperidinyl phosphite composition of the present invention when incorporated in the polyolefin resin clearly provides less white specks at lower processing temperatures as compared to the high number of white specks observed when the phosphite and sorbitol are incorporated as separate components as shown in comparative examples 1, 2 and 3.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for preparing a piperidinyl phosphite composition comprising:

(1) mixing a solution of (a) a piperidinyl phosphite compound of the formula:

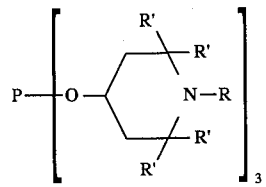

wherein R is a $C_{1-4}$ alkyl, a $C_{1-4}$ alkoxy or a $C_{1-8}$ alkanoyl group, and R' is a $C_{1-4}$ alkyl group, in a solvent, with a solution of a sorbitol compound having a melting point greater than 155° C. selected from the group consisting of dibenzylidene sorbitol, bis(p-methylbenzylidene) sorbitol, bis(3,5-dimethylbenzylidene) sorbitol and bis(p-ethylbenzylidene) sorbitol, in a solvent, wherein both solvents are polar solvents that do not react with the piperdinyl phosphite compound or with the sorbitol compound and the ratio of (a) to (b) is from 1:1 to 1:10 or 2:1, (2) evaporating the solvent to obtain a mixture of the piperidinyl phosphite compound and the sorbitol compound, (3) drying the mixture, and (4) pulverizing.

2. The piperidinyl phosphite composition of claim 1, wherein the piperidinyl phosphite compound is a tris-(1,2,2,6,6-pentamethylpiperidinyl) phosphite.

3. A polyolefin composition comprising (A) 100 parts of a propylene polymer material and (B) from 0.02 to 0.6 parts of a piperidinyl phosphite composition consisting essentially of a mixture of (a) a piperidinyl phosphite compound of the formula:

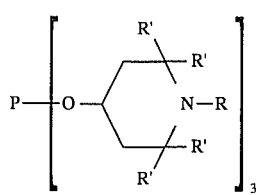

wherein R is a $C_{1-4}$ alkyl group, a $C_{1-4}$ alkoxy group or a $C_{1-8}$ alkanoyl group, and R' is a $C_{1-4}$ alkyl group; and (b) a sorbitol compound having a melting point greater than 155° C. selected from the group consisting of dibenzylidene sorbitol, bis(p-methylbenzylidene) sorbitol, bis(3,5-dimethylbenzylidene) sorbitol and bis(p-ethylbenzylidene) sorbitol, wherein the ratio of (a) to (b) is from 1:1 to 1:10 or 2:1 and the mixture is prepared by the process of claim 1.

4. The composition of claim 3, wherein the propylene polymer material of component (A) is a homopolymer of propylene, or a copolymer of propylene and ethylene or a $C_{4-10}$ alpha-olefin.

5. The composition of claim 4, wherein the piperidinyl phosphite compound is a tris-(1,2,2,6,6-pentamethylpiperidinyl) phosphite.

* * * * *